United States Patent
Kong (10) Patent No.: US 11,204,790 B2
(45) Date of Patent: *Dec. 21, 2021

(54) DISPLAY METHOD FOR USE IN MULTI-OPERATING SYSTEMS AND ELECTRONIC DEVICE

(71) Applicant: CLOUDMINDS (SHENZHEN) ROBOTICS SYSTEMS CO., LTD., Guangdong (CN)

(72) Inventor: Xiangxiao Kong, Guangdong (CN)

(73) Assignee: CLOUDMINDS (SHENZHEN) ROBOTICS SYSTEMS CO., LTD., Shenzhen (CN)

(*) Notice: Subject to any disclaimer, the term of this patent is extended or adjusted under 35 U.S.C. 154(b) by 177 days.

This patent is subject to a terminal disclaimer.

(21) Appl. No.: 16/453,015

(22) Filed: Jun. 26, 2019

(65) Prior Publication Data

US 2019/0317784 A1 Oct. 17, 2019

Related U.S. Application Data

(63) Continuation of application No. PCT/CN2016/112499, filed on Dec. 27, 2016.

(51) Int. Cl.
*G06F 9/455* (2018.01)
*G06F 9/54* (2006.01)

(52) U.S. Cl.
CPC ...... *G06F 9/45545* (2013.01); *G06F 9/45558* (2013.01); *G06F 9/544* (2013.01); *G06F 2009/45583* (2013.01)

(58) Field of Classification Search
CPC .......... G06F 2009/45583; G06F 9/455; G06F 9/45545; G06F 9/45558; G06F 9/544
See application file for complete search history.

(56) References Cited

U.S. PATENT DOCUMENTS 7,432,934 B2 * 10/2008 Salazar ................. G06F 3/1454
345/418
7,506,265 B1 * 3/2009 Traut ...................... G06F 9/451
715/763

(Continued)

FOREIGN PATENT DOCUMENTS

CN 101464843 A 6/2009
CN 101477510 A 7/2009

(Continued)

OTHER PUBLICATIONS

International Search Report dated Sep. 27, 2017; PCT/CN2016/112499.

(Continued)

*Primary Examiner* — Jorge A Chu Joy-Davila (57) ABSTRACT

A display method for use in multi-operating systems includes: in a host operating system, allocating a native window to each guest operating system; in the guest operating system, requesting a physical continuous memory (PCM) sub-region corresponding to a window from the host operating system when the window is newly created; in the host operating system, allocating the PCM sub-region to the guest operating system; in the guest operating system, storing rendered data to the PCM sub-region when the newly created window is rendered; and in the host operating system, rendering the native window corresponding to the guest operating system based on the data in the PCM sub-region when a display request from the guest operating system is monitored, and in the host operating system, displaying the native window.

12 Claims, 4 Drawing Sheets

(56) References Cited

U.S. PATENT DOCUMENTS

| | | | |
|---|---|---|---|
| 7,783,838 B1 | 8/2010 | Agesen et al. | |
| 10,049,625 B1* | 8/2018 | Shanmugasundaram | G06F 3/04883 |
| 2005/0210158 A1* | 9/2005 | Cowperthwaite | G06F 9/45558 710/1 |
| 2007/0018992 A1* | 1/2007 | Wong | G06F 3/1438 345/545 |
| 2008/0168479 A1* | 7/2008 | Purtell | G06F 9/45558 719/328 |
| 2008/0222633 A1* | 9/2008 | Kami | G06F 9/5077 718/1 |
| 2009/0153575 A1 | 6/2009 | Wang et al. | |
| 2009/0174722 A1* | 7/2009 | Liang | G09G 5/222 345/582 |
| 2012/0278803 A1* | 11/2012 | Pavlov | G06F 9/45558 718/1 |
| 2015/0281679 A1* | 10/2015 | Nguyen | H04N 13/305 345/419 |
| 2016/0044139 A1* | 2/2016 | Lin | H04L 67/1095 709/203 |
| 2016/0077898 A1 | 3/2016 | Pan et al. | |
| 2016/0358590 A1* | 12/2016 | Kim | G09G 5/39 |
| 2018/0165869 A1* | 6/2018 | Dos Santos | G06F 16/00 |
| 2020/0193556 A1* | 6/2020 | Jin | G06F 9/544 |

FOREIGN PATENT DOCUMENTS

| | | |
|---|---|---|
| CN | 101794237 A | 8/2010 |
| CN | 102541618 A | 7/2012 |
| CN | 103226490 A | 7/2013 |
| CN | 103491188 A | 1/2014 |
| CN | 103593185 A | 2/2014 |
| CN | 104662512 A | 5/2015 |
| CN | 105183551 A | 12/2015 |
| CN | 105404547 A | 3/2016 |

OTHER PUBLICATIONS

First Office Action dated Mar. 3, 2020 by CN Office; 201680002750.X.

* cited by examiner

FIG. 1

(Prior Art)

DISPLAY METHOD FOR USE IN MULTI-OPERATING SYSTEMS AND ELECTRONIC DEVICE

CROSS-REFERENCE TO RELATED APPLICATIONS

This application is a continuation of International Application No. PCT/CN2016/112499, with an international filing date of Dec. 27, 2016, the entire contents of which are incorporated herein by reference.

TECHNICAL FIELD

The present application relates to the field of virtualization technologies, and in particular, relates to a display method for use in multi-operating systems, and an electronic device.

BACKGROUND

Figure 1:
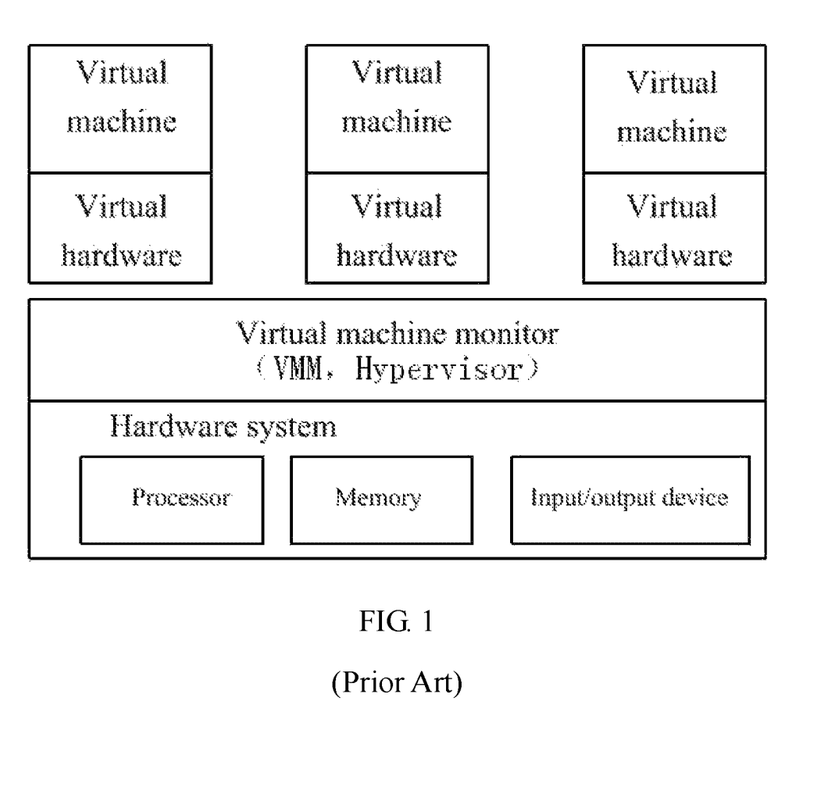
FIG. 1 is a schematic structural diagram of a conventional virtualization model according to an embodiment of the present application.

Mobile virtualization (a virtualization model as illustrated in FIG. 1) allows a plurality of virtual machines to simultaneously run on a terminal, and creates a secure and independent software running environment on bottom-layer hardware by using a hypervisor. By the mobile virtualization, a user is capable of access the plurality of virtual machines on one terminal, with no need to carry a plurality of terminals. Since there is only one entity terminal but a plurality of virtual machines, how to high-efficiently and smoothly display windows of the plurality of virtual machines is a critical issue affecting user experience.

At present, a commonly used method is: duplicating the windows to be displayed to a host operating system by using a QEMU (an emulation processor), such that the host operating system directly writes content in the windows to a frame buffer by using a central processing unit (CPU) to display the windows.

SUMMARY

An embodiment of the present application provides a display method for use in multi-operating systems. The method includes: in a host operating system, allocating a native window to each guest operating system; in the guest operating system, requesting a physical continuous memory (PCM) sub-region corresponding to a window from the host operating system when the window is newly created; in the host operating system, allocating the PCM sub-region to the guest operating system; in the guest operating system, storing rendered data to the PCM sub-region when the newly created window is rendered; and in the host operating system, rendering the native window corresponding to the guest operating system based on the data in the PCM sub-region when a display request from the guest operating system is monitored, and in the host operating system, displaying the native window.

Another embodiment of the present application provides an electronic device. The electronic device includes: a memory, and at least one processor; wherein the memory is communicably connected to the at least one processor via a communication bus; the at least one processor is configured to perform instructions stored in the memory; and the memory stores instructions for performing the steps of: in a host operating system, allocating a native window to each guest operating system; in the guest operating system, requesting a physical continuous memory (PCM) sub-region corresponding to a window from the host operating system when the window is newly created; in the host operating system, allocating the PCM sub-region to the guest operating system; in the guest operating system, storing rendered data to the PCM sub-region when the newly created window is rendered; and in the host operating system, rendering the native window corresponding to the guest operating system based on the data in the PCM sub-region when a display request from the guest operating system is monitored, and in the host operating system, displaying the native window.

Still another embodiment of the present application provides a computer program product for use in combination with an electronic device. The computer program product includes: a computer program embedded into a computer-readable storage medium; wherein the computer program includes instructions for causing the electronic device to perform the steps of: in a host operating system, allocating a native window to each guest operating system; in the guest operating system, requesting a physical continuous memory (PCM) sub-region corresponding to a window from the host operating system when the window is newly created; in the host operating system, allocating the PCM sub-region to the guest operating system; in the guest operating system, storing rendered data to the PCM sub-region when the newly created window is rendered; and in the host operating system, rendering the native window corresponding to the guest operating system based on the data in the PCM sub-region when a display request from the guest operating system is monitored, and in the host operating system, displaying the native window.

BRIEF DESCRIPTION OF THE DRAWINGS

Specific embodiments of the present application are described hereinafter in detail with reference to the accompanying drawings.

DETAILED DESCRIPTION

For clearer descriptions of the technical solutions and advantages of the present application, exemplary embodiments of the present application are described in detail hereinafter with reference to the accompanying drawings. Apparently, the described embodiments are merely a part of embodiments of the present application, instead of all the embodiments of the present application. It should be noted that in cases of no conflict, the embodiments and features in the embodiments of the present application may be combined together.

The applicant has identified in practice of the present application:

In a conventional display method, data in windows to be displayed by virtual machines is duplicated to a host operating system by using a QEMU, such that the host operating system directly writes the data into a frame buffer by using a CPU. In this method, display efficiency is severely affected due to a data transmission rate in the data duplication process. Therefore, this method may not accommodate the requirements of productization.

Accordingly, the present application provides a display method for use in multi-operating systems. The method includes: in the host operating system, allocating a native window to each guest operating system; in the guest operating system, requesting a physical continuous memory (PCM) sub-region corresponding to a window from the host operating system when the window is newly created; in the host operating system, allocating the PCM sub-region to the guest operating system; in the guest operating system, storing rendered data to the PCM sub-region when the newly created window is rendered; and in the host operating system, rendering the native window corresponding to the guest operating system based on the data in the PCM sub-region, and displaying the native window, when a display request from the guest operating system is monitored. In this way, display efficiency is improved.

Figure 2:
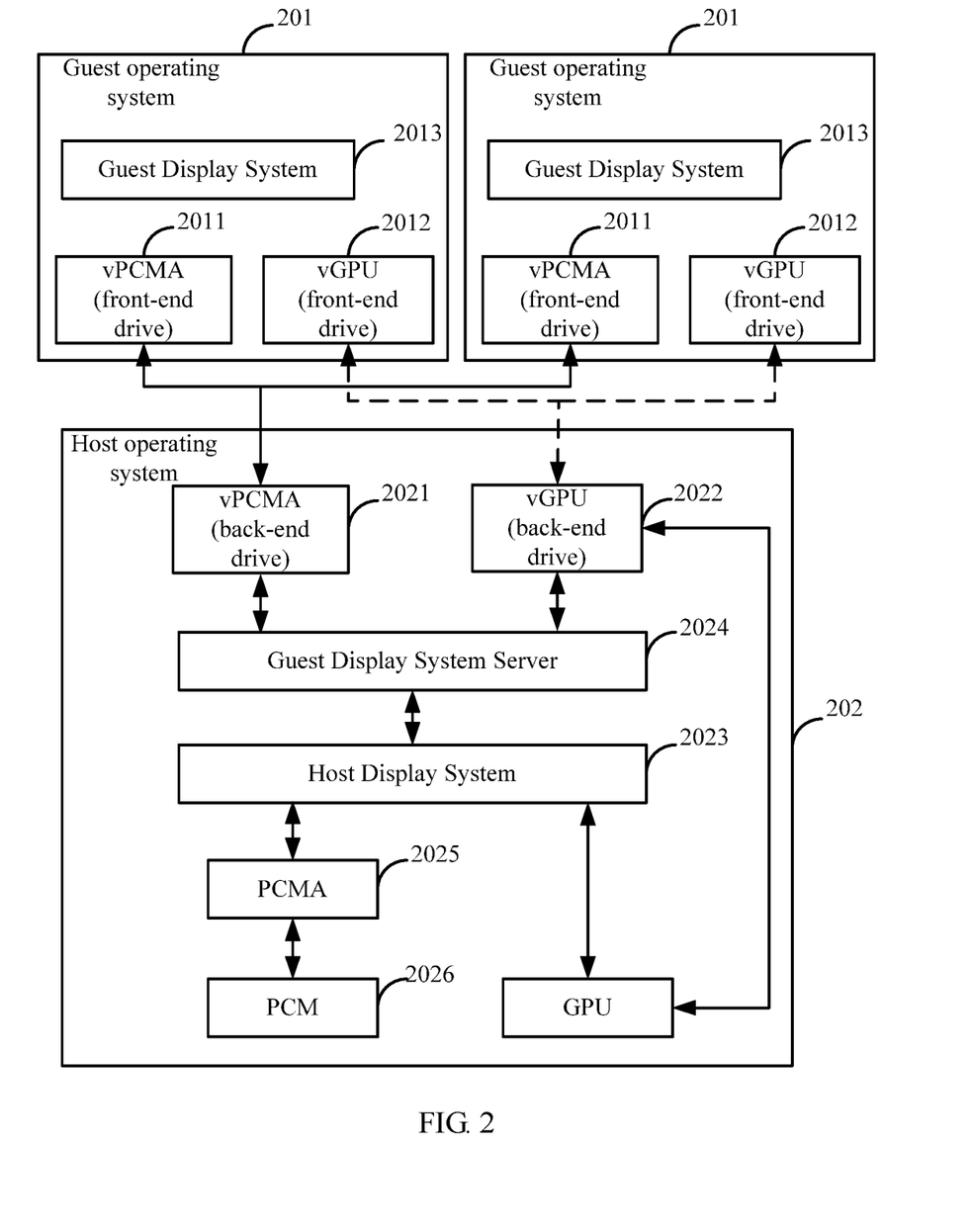
FIG. 2 is a schematic structural diagram of a system using display for use in multi-operating systems according to an embodiment of the present application.

The display method for use in multi-operating systems according to the present application is applied to a system as illustrated in FIG. 2. The system includes a plurality of guest operating systems 201 and a host operating system 202. The host operating system 202 includes a physical continuous memory (PCM) 2026. In addition, the host operating system 202 further includes a display-related device, for example, a FrameBuffer, a graphics processing unit (GPU). The FrameBuffer is a final display device, and the GPU is responsible for all image rendering and synthesizing operations.

The PCM 2026 is shared between all the guest operating systems 201 and the host operating system 202. Each guest operating system 201 may write data into the PCM 2026. The host operating system 202 may read data from the PCM 2026.

Since the guest operating systems 201 have no entity hardware device, the display system may implement virtualization of the display-related device.

Referring to FIG. 2:

(1) Each guest operating system 201 corresponds to a native window in the host operating system 202. Each guest operating system 201 includes a virtualized physical continuous memory allocator (PCMA), i.e., a vPCMA 2011, and a virtualized GPU, i.e., a vGPU 2021.

In addition, each guest operating system 201 further includes a guest display system 2013. The guest display system 2013 is generally implemented by the guest operating system 201. For example, if the guest operating system 201 is an Android system, a SufaceFlinger is the guest display system 2013.

In addition, the guest operating system 201 is provided with a front-end drive.

(2) The host operating system 202 includes a virtualized PCMA, i.e., a vPCMA 2021, a virtualized GPU, i.e., a vGPU 2022.

Besides, the host operating system 202 further includes a host display system 2023.

In addition, the host operating system is provided with a back-end drive. The host operating system 202 further includes a guest display system server 2024 implementing a guest display system service in the host operating system.

Further, the host operating system 202 further includes a PCMA 2025. The PCMA 2025 may manage the PCM 2026, for example, requesting a PCM sub-region (a memory space with a continuous physical address) in the PCM 2026 and allocating the PCM sub-region to direct memory access (DMA) devices such as a video, a camera or the like.

(3) The guest operating system 201 communicates with the host operating system 202 based on a data interaction between the front-end drive and the back-end drive.

For example, the guest operating system 201 shares the PCM 2026 via communication between the front-end drive and the back-end drive.

Figure 3:
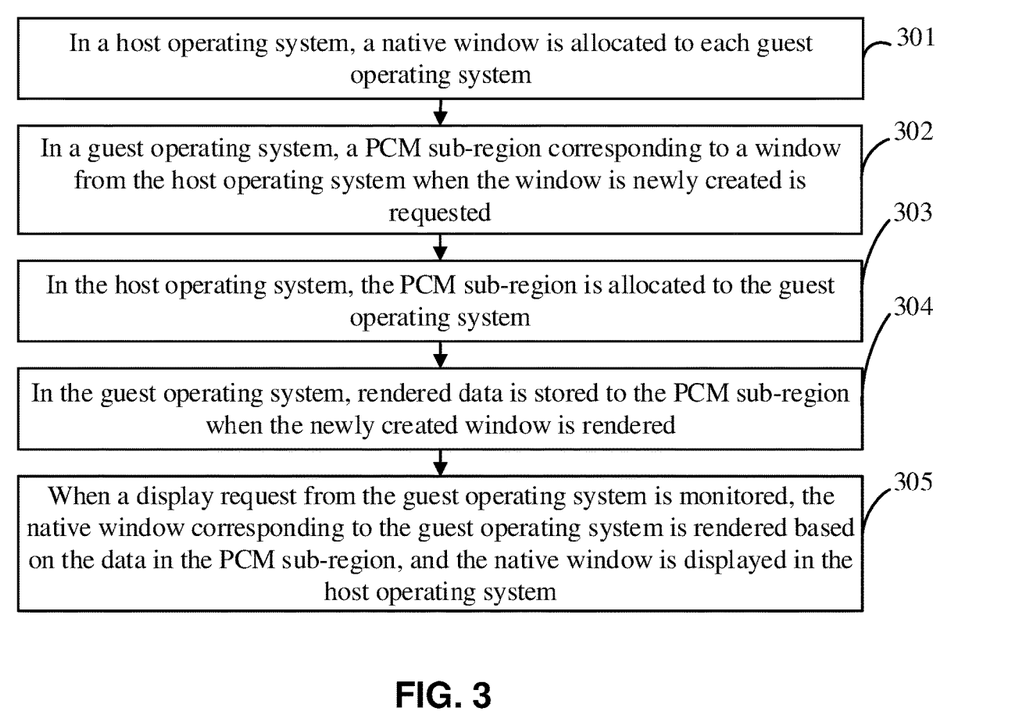
FIG. 3 is a flowchart of a display method for use in multi-operating systems according to an embodiment of the present application.

With respect to the display system as illustrated in FIG. 2, a general process of displaying windows by using the display method for use in multi-operating systems according to the present applications is as illustrated in FIG. 3, and includes the following steps:

301. In a host operating system, a native window is allocated to each guest operating system.

302: In a guest operating system, a PCM sub-region corresponding to a window from the host operating system when the window is newly created is requested.

Specifically, in the guest operating system, when the window is newly created, a memory share request is sent to the host operating system. For example, a PCM sub-region corresponding to a window from the host operating system when any of the guest operating systems 201 newly creates the window is requested in the guest operating system 201.

This step may be practiced as follows: Any of the guest operating systems 201 sends a PCM sub-region request to the PCMA 2025 via the vPCMA 2021 in the host operating system 202 based on the vPCMA 2011 and communication between the front-end drive and the back-end drive, and the PCMA 2025 allocates a sub-region in the PCM 2026 based on the request.

303: In the host operating system, the PCM sub-region is allocated to the guest operating system.

Specifically, in the host operating system, after the memory share request is received, the PCM sub-region is allocated to the guest operating system by Gralloc (a memory share management module), the PCM sub-region is converted into a texture, and an index value of the texture is returned to the guest operating system; and

304: In the guest operating system, rendered data is stored to the PCM sub-region when the newly created window is rendered.

In practice, the rendered data is stored to the PCM sub-region based on the index value.

The PCM 2026 is shared between all the guest operating systems and the host operating system 202. Therefore, each guest operating system 201 may write data into the PCM 2026. The host operating system 202 may read data from the PCM 2026. Therefore, any of the guest operating systems 201 may store the rendered data to the PCM sub-region.

For example, any of the guest operating systems 201, via the vPCMA 2021 in the host operating system 202 based on the vPCMA 2011 and communication between the front-end drive and the back-end drive, make the PCMA 2025 stores the rendered data to the PCM sub-region corresponding to a PCM sub-region descriptor.

305: When a display request from the guest operating system is monitored, the native window corresponding to the guest operating system is rendered based on the data in the PCM sub-region, and the native window is displayed in the host operating system.

The display request from the guest operating system may be monitored in a plurality of ways. For example, when it is monitored that any of the guest operating systems 201 sends a window display instruction to the host operating system 202, it is determined that the display request from the guest operating system is monitored.

The native window may be displayed in a plurality of ways. For example, the native window is topped.

Through steps 301 to 305, the window of the guest operating system may be displayed by topping the native window, such that reduction of the display efficiency caused by data duplication is prevented.

For clearer description of advantages of the display method according to the present application, hereinafter, using a scenario where the guest operating system 201 is a guest and the host operating system 202 is a host as an example, a comparison is made between the display method in the related art and the display method according to the present application.

I. Display Method in the Related Art

In the related art, after each guest in the related art creates its own window, multiple windows are superimposed to the FrameBuffer for display of the windows of the guest. Specifically:

(1) The guest creates a window, a memory region with a desired size is requested on the guest via a virtual memory allocator (VMA) of the guest, and a memory region with a desired size is also requested in the guest display system server on the host by calling the VMA of the host, wherein the memory region is a common memory region, i.e., a memory with no continuous physical address.

(2) The guest fills content on the window, content data is transmitted to the guest display system server on the host via the front-end drive of the guest and the back-end drive of the host, and then the content data is rendered to a memory region corresponding to the window on the host, wherein the rendered data is in an RGBA format.

(3) Steps (1) and (2) are sequentially repeated on the guest based on the actual needs.

(4) When the guest displays all the windows in a superimposition fashion, by calling the host via a vGPU, memory regions corresponding to all the windows are sequentially rendered to an off-screen FrameBuffer, and then data in the FrameBuffer is duplicated to a temporary memory and data in the memory is duplicated to a real FrameBuffer for display.

In this way, the windows of the guest are displayed.

II. Display Method According to the Present Application

In the display method according to the present application, displayed windows of all the guests may be taken into management by the host. When a guest turns active, the host tops the native window of the host corresponding to the window of the guest, such that window switchover of multiple guests may be quickly practiced. Specifically:

(1) In the guest, each window corresponds to a PCM sub-region of the host. That is, each time a window is created on the guest, the PCMA may request a PCM sub-region on the host. When the guest renders the window, the rendering is carried out in the PCM sub-region on the host, and rendered data is stored in the PCM sub-region.

(2) When multiple windows are rendered and displayed in a superimposition fashion, the host may correspondingly render the data in the PCM sub-regions corresponding to the windows of the guests to the corresponding native windows in the guest system in this system in the superimposition fashion. These native windows may be further sequentially rendered to a real display device by a display management system in the host system in the superimposition fashion. The PCM sub-regions one-to-one correspond to the windows of the guests, and the native windows one-to-one correspond to the guest systems. That is, content presented in each native window is content that is presented in the superimposition fashion on all the windows of the corresponding guest.

(3) When a native window is topped, the display system of the host may display the native window, that is, display a desktop of the guest corresponding to the native window.

In this way, the windows of the guest are displayed.

Through the comparison between the display method in the related art and the display method according to the present application, it is identified that in the display method according to the present application, the guest supports such operations as requesting a PCM, writing data into a PCM region and the like, and the guest and the host may share a memory. In this way, request and management of the physical continuous memory of a DMA device are supported, and time elapsed for duplicating data on the guest and the host is reduced.

In addition, the native window is added on the host, and the rendered data may be directly written to the FrameBuffer via the GPU, with no need of the CPU. However, in the related art, upon rendering, the data is firstly duplicated to the memory via the CPU, and then the data is written into the FrameBuffer from the memory via the CPU. Therefore, the display method according to the present application may greatly improve the display efficiency.

Furthermore, since one desktop of the guest corresponds to one native window, with respect to switchover-fashioned display of all the desktops of multiple guests, the native window corresponding to the desktop of the guest only needs to be topped. In this way, high-efficient, flexible and smooth switchover between the windows of the guest may be implemented, and display of the windows of the multiple guests is better managed.

Beneficial Effects:

In the host operating system according to the embodiments of the present application, in the host operating system, a native window is allocated to each guest operating system; in the guest operating system, a PCM sub-region corresponding to a window is requested from the host operating system when the window is newly created; in the host operating system, the PCM sub-region is allocated to the guest operating system; in the guest operating system, rendered data is stored to the PCM sub-region when the newly created window is rendered; and in the host operating system, the native window corresponding to the guest operating system is rendered based on the data in the PCM sub-region, and the native window is displayed, when a display request from the guest operating system is monitored. In this way, display efficiency is improved.

Based on the same inventive concept, the present application further provides a display apparatus for use in multi-operating systems. The principle based on which the display apparatus for use in multi-operating systems solves the problems is similar to the principle based on which the display method for use in multi-operating systems. Therefore, practice of the display apparatus may be referenced to that of the display method, which is not described herein any further.

Figure 4:
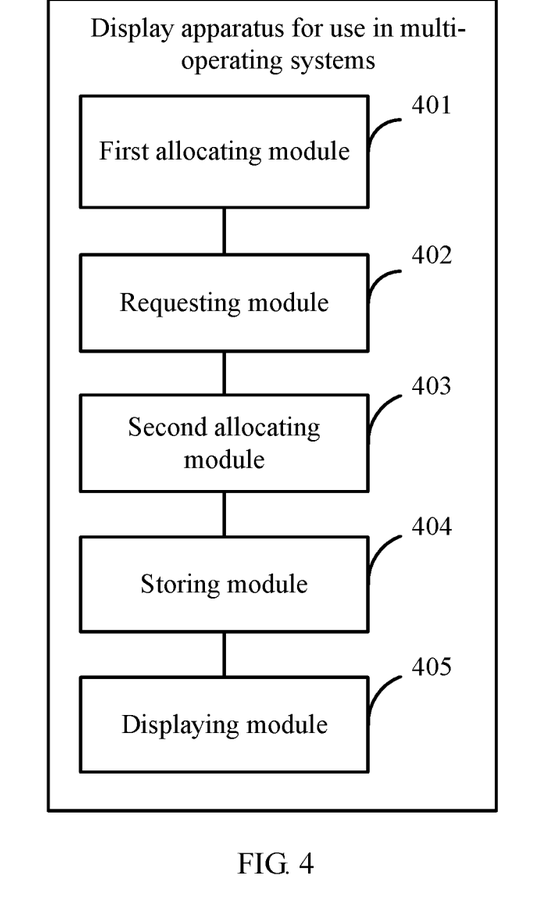
FIG. 4 is a schematic structural diagram of another display apparatus for use in multi-operating systems according to an embodiment of the present application.

As illustrated in FIG. 4, the display apparatus for use in multi-operating systems includes:

a first allocating module 401, configured to allocate a native window to each guest operating system in a host operating system;

a requesting module 402, configured to request a physical continuous memory (PCM) sub-region corresponding to a window from the host operating system when the window is newly created in the guest operating system;

a second allocating module 403, configured to allocate the PCM sub-region to the guest operating system in the host operating system;

a storing module 404, configured to store rendered data to the PCM sub-region when the newly created window is rendered in the guest operating system; and a displaying module 405, configured to render the native window corresponding to the guest operating system based on the data in the PCM sub-region, and display the native window in the host operating system, when a display request from the guest operating system is monitored.

Optionally, the requesting module 402 is further configured to, in the guest operating system, when the window is newly created, send a memory share request to the host operating system;

the second allocating module 403 is further configured to, in the host operating system, upon receiving the memory share request, allocate the PCM sub-region to the guest operating system by a memory share management module Gralloc, convert the PCM sub-region into a texture, and return an index value of the texture to the guest operating system; and the storing module 404 is further configured to store the rendered data to the PCM sub-region based on the index value.

Optionally, the displaying module 405 is further configured to, when the display request from the guest operating system is monitored, render the native window corresponding to the guest operating system based on various PCM sub-regions corresponding to the native window of the guest operating system.

Beneficial Effects:

In the host operating system according to the embodiment of the present application, a native window allocated to each guest operating system in the host operating system; a PCM sub-region corresponding to a window is requested from the host operating system when the window is newly created in the guest operating system; the PCM sub-region is allocated to the guest operating system in the host operating system; rendered data is stored to the PCM sub-region when the newly created window is rendered in the guest operating system; and the native window corresponding to the guest operating system is rendered based on the data in the PCM sub-region, and the native window is displayed in the host operating system, when a display request from the guest operating system is monitored. In this way, display efficiency is improved.

Figure 5:
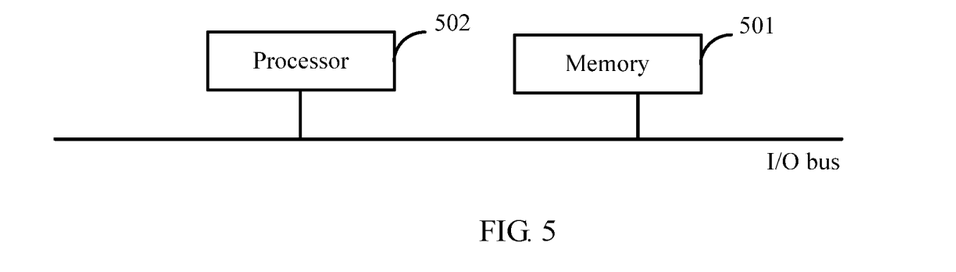
FIG. 5 is a schematic structural diagram of an electronic device according to an embodiment of the present application.

In a still another aspect, an embodiment of the present application further provides an electronic device. Referring to FIG. 5, the electronic device includes:

a memory 501, and at least one processor 502; wherein the memory is communicably connected to the at least one processor via a communication bus; the at least one processor is configured to perform instructions stored in the memory; and the memory stores instructions for performing all the steps in the display method for use in multi-operating systems according to any one of the above embodiments.

In yet still another aspect, an embodiment of the present application further provides a computer program product for use in combination with the electronic device. The computer program product includes a computer program embedded into a computer-readable storage medium; wherein the computer program includes instructions for causing the electronic device to perform all the steps in the display method for use in multi-operating systems according to any one of the above embodiments.

Those skilled in the art shall understand that the embodiments of the present application may be described as illustrating methods, systems, or computer program products. Therefore, hardware embodiments, software embodiments, or hardware-plus-software embodiments may be used to illustrate the present application. In addition, the present application may further employ a computer program product which may be implemented by at least one non-transitory computer-readable storage medium with an executable program code stored thereon. The non-transitory computer-readable storage medium includes but not limited to a disk memory, a CD-ROM, and an optical memory.

The present application is described based on the flowcharts and/or block diagrams of the method, device (system), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product including an instruction apparatus, wherein the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although the preferred embodiments of the present application are described above, once knowing the basic creative concept, a person skilled in the art can make other modifications and variations to these embodiments. Therefore, the appended claims are intended to be construed as covering the preferred embodiments and all the modifications and variations falling within the scope of the present application.

What is claimed is:

1. A display method for use in multi-operating systems, comprising:

in a host operating system, allocating a native window to each guest operating system;

in the guest operating system, requesting a physical continuous memory (PCM) sub-region corresponding to a second window from the host operating system when the second window is newly created;

in the host operating system, allocating the PCM sub-region to the guest operating system;

in the guest operating system, storing rendered data to the PCM sub-region when the newly created second window is rendered, wherein the guest operating system supports directly writing data into the PCM sub-region, and wherein the guest operating system and the host operating system share the PCM sub-region; and in the host operating system, rendering the native window corresponding to the guest operating system based on the data in the PCM sub-region when a display request from the guest operating system is monitored, and in the host operating system, displaying the native window;

wherein in the guest operating system, requesting the PCM sub-region corresponding to the second window from the host operating system when the second window is newly created comprises:

in the quest operating system, when the second window is newly created, sending a memory share request to the host operating system;

in the host operating system, allocating the PCM sub-region to the quest operating system comprises:

in the host operating system, upon receiving the memory share request, allocating the PCM sub-region to the quest operating system by a memory share management module Gralloc;

converting the PCM sub-region into a texture; and returning an index value of the texture to the guest operating system; and storing the rendered data to the PCM sub-region comprises:

storing the rendered data to the PCM sub-region based on the index value;

wherein displaying the native window comprises:

topping the native window.

2. The method according to claim 1, wherein in the guest operating system, when the second window is newly created, sending the memory share request to the host operating system comprises:

the guest operating system sends a PCM sub-region request to Physical Continuous Memory Allocator (PCMA) in the host operating system via virtualized Physical Continuous Memory Allocator (vPCMA) in the host operating system based on the vPCMA in the guest operating system and communication between the front-end drive and the back-end drive;

in the host operating system allocating the PCM sub-region to the guest operating system comprises:

the PCMA in the host operating system allocates a sub-region in the PCM based on the request;

storing rendered data to the PCM sub-region comprises:

the guest operating system, via the vPCMA in the host operating system based on the vPCMA in the guest operating system and communication between the front-end drive and the back-end drive, make the PCMA in the host operating system stores the rendered data to the PCM sub-region corresponding to a PCM sub-region descriptor.

3. The method according to claim 1, wherein in the host operating system, rendering the native window corresponding to the guest operating system based on the data in the PCM sub-region when the display request from the guest operating system is monitored comprises:

when the display request from the guest operating system is monitored, rendering the native window corresponding to the guest operating system based on various PCM sub-regions corresponding to the native window of the guest operating system.

4. The method according to claim 1, wherein when the display request from the guest operating system is monitored comprises:

when it is monitored that any of the guest operating systems sends a window display instruction to the host operating system, it is determined that the display request from the guest operating system is monitored.

5. An electronic device, comprising:

a memory, and at least one processor; wherein the memory is communicably connected to the at least one processor via a communication bus; the at least one processor is configured to perform instructions stored in the memory; and the memory stores instructions for performing the steps of:

in a host operating system, allocating a native window to each guest operating system;

in the guest operating system, requesting a physical continuous memory (PCM) sub-region corresponding to a second window from the host operating system when the second window is newly created;

in the host operating system, allocating the PCM sub-region to the guest operating system;

in the guest operating system, storing rendered data to the PCM sub-region when the newly created window is rendered, wherein the guest operating system supports directly writing data into the PCM sub-region, and wherein the guest operating system and the host operating system share the PCM sub-region; and in the host operating system, rendering the native window corresponding to the guest operating system based on the data in the PCM sub-region when a display request from the guest operating system is monitored, and in the host operating system, displaying the native window;

wherein the requesting the PCM sub-region corresponding to the second window from the host operating system when the second window is newly created in the guest operating system comprises:

in the guest operating system, when the second window is newly created, sending a memory share request to the host operating system;

the allocating the PCM sub-region to the guest operating system in the host operating system comprises:

in the host operating system, upon receiving the memory share request, allocating the PCM sub-region to the guest operating system by a memory share management module Gralloc;

converting the PCM sub-region into a texture; and returning an index value of the texture to the guest operating system; and storing the rendered data to the PCM sub-region comprises:

storing the rendered data to the PCM sub-region based on the index value;

wherein displaying the native window comprises:

topping the native window.

6. The electronic device according to claim 5, wherein in the guest operating system, when the second window is newly created, sending the memory share request to the host operating system comprises:

the guest operating system sends a PCM sub-region request to Physical Continuous Memory Allocator (PCMA) in the host operating system via virtualized Physical Continuous Memory Allocator (vPCMA) in the host operating system based on the vPCMA in the guest operating system and communication between the front-end drive and the back-end drive;

the allocating the PCM sub-region to the guest operating system in the host operating system comprises:

the PCMA in the host operating system allocates a sub-region in the PCM based on the request;

storing rendered data to the PCM sub-region comprises:

the guest operating system, via the vPCMA in the host operating system based on the vPCMA in the guest operating system and communication between the front-end drive and the back-end drive, make the PCMA in the host operating system stores the rendered data to the PCM sub-region corresponding to a PCM sub-region descriptor.

7. The electronic device according to claim 5, wherein rendering the native window corresponding to the guest operating system based on the data in the PCM sub-region in the host operating system when the display request from the guest operating system is monitored comprises:

when the display request from the guest operating system is monitored, rendering the native window corresponding to the guest operating system based on various PCM sub-regions corresponding to the native window of the guest operating system.

8. The electronic device according to claim 5, wherein when the display request from the guest operating system is monitored comprises:

when it is monitored that any of the guest operating systems sends a window display instruction to the host operating system, it is determined that the display request from the guest operating system is monitored.

9. A computer program product for use in combination with an electronic device, comprising a computer program embedded into a non-transitory computer-readable storage medium; wherein the computer program comprises instructions for causing the electronic device to perform the steps of:

in a host operating system, allocating a native window to each guest operating system;

in the guest operating system, requesting a physical continuous memory (PCM) sub-region corresponding to a second window from the host operating system when the second window is newly created;

in the host operating system, allocating the PCM sub-region to the guest operating system;

in the guest operating system, storing rendered data to the PCM sub-region when the newly created second window is rendered, wherein the guest operating system supports directly writing data into the PCM sub-region, and wherein the guest operating system and the host operating system share the PCM sub-region; and in the host operating system, rendering the native window corresponding to the guest operating system based on the data in the PCM sub-region when a display request from the guest operating system is monitored, and in the host operating system, displaying the native window;

wherein in the quest operating system, requesting the PCM sub-region corresponding to the second window from the host operating system when the second window is newly created comprises:

in the quest operating system, when the second window is newly created, sending a memory share request to the host operating system;

in the host operating system, allocating the PCM sub-region to the quest operating system comprises:

in the host operating system, upon receiving the memory share request, allocating the PCM sub-region to the guest operating system by a memory share management module Gralloc;

converting the PCM sub-region into a texture; and returning an index value of the texture to the guest operating system; and storing the rendered data to the PCM sub-region comprises:

storing the rendered data to the PCM sub-region based on the index value wherein displaying the native window comprises:

topping the native window.

10. The computer program product according to claim 9, wherein in the guest operating system, when the second window is newly created, sending the memory share request to the host operating system comprises:

the guest operating system sends a PCM sub-region request to Physical Continuous Memory Allocator (PCMA) in the host operating system via virtualized Physical Continuous Memory Allocator (vPCMA) in the host operating system based on the vPCMA in the guest operating system and communication between the front-end drive and the back-end drive;

in the host operating system, allocating the PCM sub-region to the guest operating system comprises:

the PCMA in the host operating system allocates a sub-region in the PCM based on the request;

storing rendered data to the PCM sub-region comprises:

the guest operating system, via the vPCMA in the host operating system based on the vPCMA in the guest operating system and communication between the front-end drive and the back-end drive, make the PCMA in the host operating system stores the rendered data to the PCM sub-region corresponding to a PCM sub-region descriptor.

11. The computer program product according to claim 9, wherein in the host operating system, rendering the native window corresponding to the guest operating system based on the data in the PCM sub-region when the display request from the guest operating system is monitored comprises:

when the display request from the guest operating system is monitored, rendering the native window corresponding to the guest operating system based on various PCM sub-regions corresponding to the native window of the guest operating system.

12. The computer program product according to claim 9, wherein when the display request from the guest operating system is monitored comprises:

when it is monitored that any of the guest operating systems sends a window display instruction to the host operating system, it is determined that the display request from the guest operating system is monitored.

* * * * *